(12) United States Patent
Baba et al.

(10) Patent No.: US 10,116,176 B2
(45) Date of Patent: Oct. 30, 2018

(54) PERMANENT MAGNET EMBEDDED ELECTRIC MOTOR, COMPRESSOR AND REFRIGERATION AIR CONDITIONER

(71) Applicant: Mitsubishi Electric Corporation, Tokyo (JP)

(72) Inventors: Kazuhiko Baba, Tokyo (JP); Masahiro Nigo, Tokyo (JP); Atsushi Ishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 78 days.

(21) Appl. No.: 15/511,781

(22) PCT Filed: Oct. 7, 2014

(86) PCT No.: PCT/JP2014/076809
§ 371 (c)(1),
(2) Date: Mar. 16, 2017

(87) PCT Pub. No.: WO2016/056065
PCT Pub. Date: Apr. 14, 2016

(65) Prior Publication Data
US 2017/0294814 A1    Oct. 12, 2017

(51) Int. Cl.
*H02K 1/27* (2006.01)
*F04B 39/00* (2006.01)
(Continued)

(52) U.S. Cl.
CPC ............ *H02K 1/276* (2013.01); *F04B 35/04* (2013.01); *F04B 39/00* (2013.01);
(Continued)

(58) Field of Classification Search
None
See application file for complete search history.

(56) References Cited

U.S. PATENT DOCUMENTS 8,937,420 B2    1/2015   Yabe et al.
10,020,699 B2 *  7/2018   Ishikawa ................ H02K 1/276
                                                         310/156.53
(Continued)

FOREIGN PATENT DOCUMENTS

JP    09-131009 A    5/1997
JP    10-285845 A    10/1998
(Continued)

OTHER PUBLICATIONS

International Search Report of the International Searching Authority dated Dec. 22, 2014 for the corresponding international application No. PCT/JP2014/076809 (and English translation).
(Continued)

*Primary Examiner* — Tran Nguyen
(74) *Attorney, Agent, or Firm* — Posz Law Group, PLC

(57) ABSTRACT

In a permanent magnet embedded electric motor, a rotor iron core of a rotor disposed on an inner diameter side of a stator includes: a plurality of first slits that are formed on a radial direction outer side of a magnet insertion hole, and communicate with the magnet insertion hole; a plurality of second slits formed at positions opposed to and spaced apart from the first slits; inter-slit iron core portions formed between the first slits and the second slits; outer side iron core portions formed between the second slits and an outer circumferential surface of the rotor iron core; space portions communicating with rotating direction end portions of the magnet insertion hole; and thin iron core portions that are formed between the space portions and the outer circumferential surface of the rotor iron core, and extend in a rotating direction.

9 Claims, 5 Drawing Sheets

(51) Int. Cl.
*F25B 31/02* (2006.01)
*F04B 35/04* (2006.01)
*F04C 23/00* (2006.01)
*F04B 39/02* (2006.01)
*H02K 21/16* (2006.01)
*H02K 7/14* (2006.01)
*F04C 29/00* (2006.01)
*F04D 25/06* (2006.01)
*F04C 18/356* (2006.01)

(52) U.S. Cl.
CPC ........ *F04B 39/0061* (2013.01); *F04B 39/023* (2013.01); *F04C 23/008* (2013.01); *F25B 31/026* (2013.01); *H02K 1/27* (2013.01); *H02K 7/14* (2013.01); *H02K 21/16* (2013.01); *F04C 18/356* (2013.01); *F04C 29/0085* (2013.01); *F04C 2240/40* (2013.01); *F04D 25/06* (2013.01); *H02K 2213/03* (2013.01)

(56) References Cited

U.S. PATENT DOCUMENTS

| | | | |
|---|---|---|---|
| 2005/0035677 A1 | 2/2005 | Evans et al. | |
| 2010/0117477 A1* | 5/2010 | Yoshino | H02K 1/276 310/156.53 |
| 2010/0119390 A1* | 5/2010 | Baba | H02K 1/276 417/423.7 |
| 2012/0175989 A1* | 7/2012 | Mathoy | H02K 1/2766 310/156.53 |
| 2012/0242182 A1* | 9/2012 | Yabe | H02K 1/276 310/156.53 |

FOREIGN PATENT DOCUMENTS

| | | |
|---|---|---|
| JP | 11-187597 A | 7/1999 |
| JP | 2001-025194 A | 1/2001 |
| JP | 2005-245148 A | 9/2005 |
| JP | 2006-509483 A | 3/2006 |
| JP | 2008-022601 A | 1/2008 |
| JP | 2012-105482 A | 5/2012 |
| JP | 2012-217249 A | 11/2012 |
| WO | 2011/096094 A1 | 8/2011 |

OTHER PUBLICATIONS

Office Action dated Aug. 15, 2017 issued in corresponding JP patent application No. 2016-552736 (and partial English translation).
Office action dated Jul. 4, 2018 issued in corresponding CN patent application No. 2014 800 82498.9 (and English machine translation thereof).

* cited by examiner

PERMANENT MAGNET EMBEDDED ELECTRIC MOTOR, COMPRESSOR AND REFRIGERATION AIR CONDITIONER

CROSS REFERENCE TO RELATED APPLICATION

This application is a U.S. national stage application of International Patent Application No. PCT/JP2014/076809 filed on Oct. 7, 2014, the disclosure of which is incorporated herein by reference.

TECHNICAL FIELD

The present invention relates to a permanent magnet embedded electric motor in which permanent magnets are embedded in a rotor iron core disposed on an inner diameter side of a stator, a compressor provided with the permanent magnet embedded electric motor, and a refrigeration air conditioner provide with the compressor.

BACKGROUND

Patent Literature 1 discloses a conventional motor configured to include magnet insertion holes formed in a rotor iron core, and a plurality of slits formed on the outer circumferential side of permanent magnets and coupled with the magnet insertion holes, thereby to suppress vibration and noise of the motor.

PATENT LITERATURE

Patent Literature 1: Japanese Patent Application Laid-open No. 2005-245148

However, the motor disclosed in Patent Literature 1 has a problem as follows. Magnetic fluxes flowing from the stator side to the rotor pass through an iron core portion between the magnet insertion holes and the slits, and interlink with an surface of the permanent magnets, wherein the magnetic fluxes vary with time to thereby cause an eddy current to flow in the permanent magnet, and increase the loss. In addition, magnetic force is lowered by heat generation of the permanent magnets to thereby bring about decrease in efficiency and output. Further, the motor disclosed in Patent Literature 1 has another problem as follows. The slits extend from an edge of the magnet insertion hole to near the rotor outer circumferential portion, whereby a diamagnetic field formed by the stator can easily interlink with the permanent magnets, and demagnetization resistance is deteriorated accordingly.

SUMMARY

The present invention has been made in view of the above circumstances, and an object of the present invention is to provide a permanent magnet embedded electric motor that can improve the demagnetization resistance while suppressing decrease in efficiency and output.

In order to solve the above-mentioned problems and achieve the object, the present invention provides a permanent magnet embedded electric motor comprising: a stator; a rotor disposed on an inner diameter side of the stator; and permanent magnets inserted in a plurality of magnet insertion holes formed in a rotor iron core of the rotor, wherein the rotor iron core includes: a plurality of first slits that are formed on an outer side of the magnet insertion hole, and communicate with the magnet insertion hole; a plurality of second slits formed at positions opposed to and spaced apart from the first slits; inter-slit iron core portions formed between the first slits and the second slits; outer side iron core portions formed between the second slits and an outer circumferential surface of the rotor iron core; space portions communicating with rotating direction end portions of the magnet insertion hole; and thin iron core portions that are formed between the space portions and the outer circumferential surface of the rotor iron core, and extend in a rotating direction.

Advantageous Effects of Invention

According to the present invention, there is exerted the effect that the demagnetization resistance can be improved while suppressing decrease in efficiency and output.

DETAILED DESCRIPTION

Embodiments for a permanent magnet embedded electric motor, a compressor and a refrigeration air conditioner according to the present invention will be described below in detail with reference to the drawings. The present invention is not limited to the following embodiments.

First Embodiment

Figure 1:
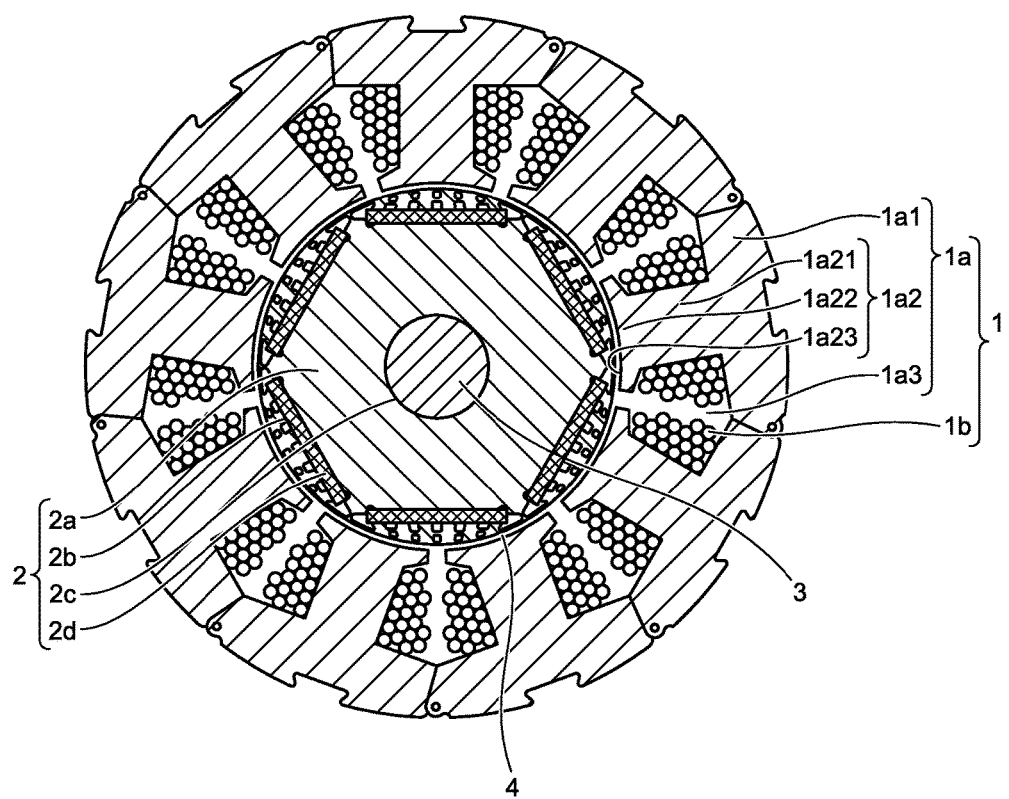
FIG. 1 is a sectional view of a permanent magnet embedded electric motor according to a first embodiment of the present invention.

FIG. 1 is a sectional view of a permanent magnet embedded electric motor according to a first embodiment of the present invention. The permanent magnet-embedded electric motor 100 includes a stator 1 composed of a stator iron core 1a and windings 1b, such that the stator iron core 1a is formed of a plurality of electromagnetic steel sheets punched out in a specific shape, which have been stacked on top of another while being swaged, welded or bonded, and the windings 1b are wound around the teeth 1a2 of the stator iron core 1a in a concentrated winding manner or distributed winding manner. The motor 100 further includes a rotor 2 disposed on the inner diameter side of the stator 1 with a gap 4 interposed therebetween.

The stator iron core 1a consists of an annular back yokes 1a1 and a plurality of teeth 1a2 that are arranged at regular intervals in a rotating direction on the inner diameter side of the back yokes 1a1 and extend in a direction toward the center of the stator iron core 1a from the back yokes 1a1. Further, in the stator iron core 1a, a plurality of slots 1a3 are formed as spaces that are demarcated by the back yokes 1a1 and the teeth 1a2 and contain the windings 1b. Here, the "rotating direction" means a rotating direction of the rotor 2. Each of the teeth 1a2 includes a winding portion 1a21 around which the winding 1b is wound, and an umbrella-like tip portion 1a22 that is formed on the inner diameter side of each of the teeth 1a2 and has a rotor-opposed surface 1a23 extending in the rotating direction. In the example illustrated in FIG. 1, the stator iron core 1a includes nine teeth 1a2 formed thereon, but the number of teeth 1a2 is not limited to this number.

The rotor 2 includes: a columnar rotor iron core 2a formed of a plurality of electromagnetic steel sheets punched out in a specific shape, which have been stacked on top of another while being swaged, welded or bonded; a plurality of magnet insertion holes 2b formed at regular intervals in the rotating direction in correspondence with the number of magnetic poles; permanent magnets 2d each of which is formed in a shape corresponding to the shape of the magnet insertion hole 2b and is inserted in the magnet insertion hole 2b; and a rotary shaft insertion hole 2c formed in a center of the rotor iron core 2a in the radial direction.

An outer circumferential surface 2A of the rotor iron core 2a is formed in a complete circle shape, and the gap 4 between the stator 1 and the rotor iron core 2a is uniform over the whole circumference. Each of the magnet insertion holes 2b has a rectangular shape with its radial direction width smaller than its rotating direction width, and the rotating direction widths of the magnet insertion holes 2b are equal to each other. The distances of the magnet insertion holes 2b from the center of the rotor iron core 2a are also equal to each other. The magnet insertion holes 2b extend through the rotor iron core 2a from one end to the other end in the axial direction, and the permanent magnets 2d are respectively arranged in the magnet insertion holes 2b, such that the permanent magnets 2d are alternately different in polarity from each other in the rotating direction. A rotary shaft 3, to which rotational energy is transmitted from a driving source (not shown), is inserted in the rotary shaft insertion hole 2c by shrinkage fitting, freeze fitting, or press fitting, and the rotor iron core 2a is rotated by the rotational energy from the driving source.

Next, with reference to FIGS. 2 to 4, a detailed explanation will be given for the structure of the rotor iron core 2a.

Figure 2:
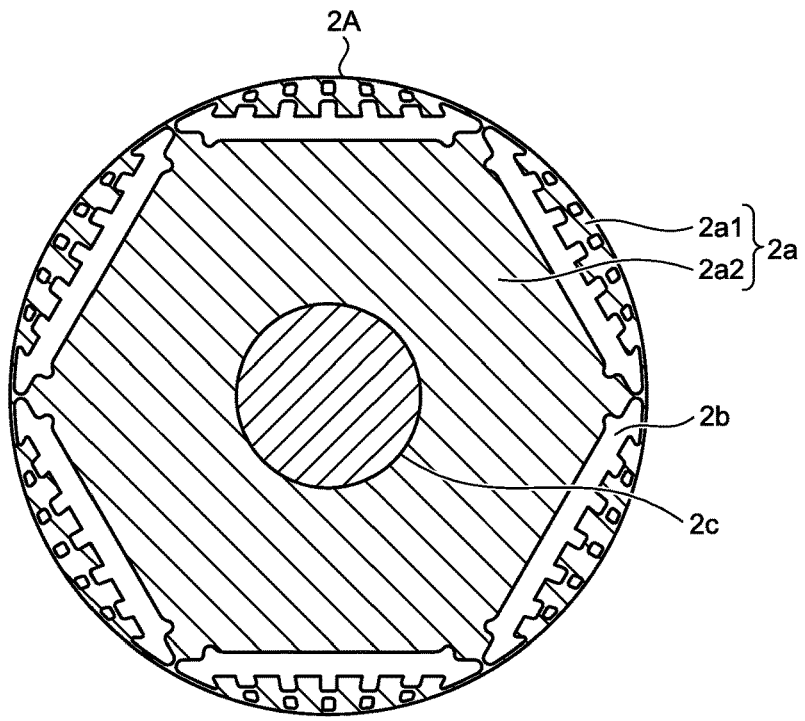
FIG. 2 is an enlarged view of a rotor iron core illustrated in FIG. 1.

FIG. 2 is an enlarged view of the rotor iron core illustrated in FIG. 1. FIG. 3 is an enlarged view of a magnet insertion hole together with first slits and second slits for one magnetic pole, in the rotor iron core illustrated in FIG. 2. FIG. 4 is a view illustrating a state where the permanent magnet is inserted in the magnet insertion hole illustrated in FIG. 3.

As illustrated in FIG. 2, the rotor iron core 2a is composed of first iron core portions 2a1 formed on an outer side of the magnet insertion holes 2b in the radial direction and a second iron core portion 2a2 formed on an inner side of the magnet insertion holes 2b in the radial direction.

Figure 3:
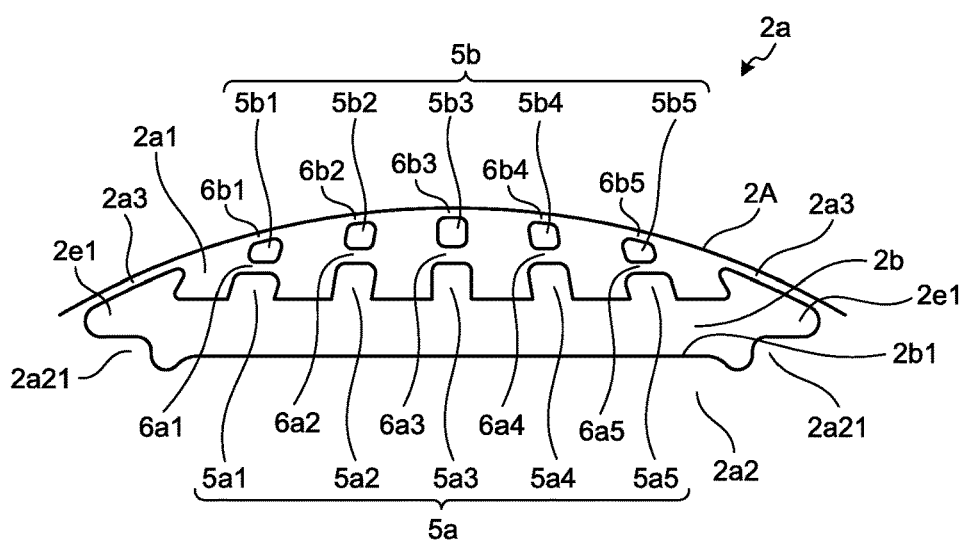
FIG. 3 is an enlarged view of a magnet insertion hole, first slits and second slits for one magnetic pole in the rotor iron core illustrated in FIG. 2.

In FIG. 3, the rotor iron core 2a includes: a first slit group 5a consisting of five first slits 5a1, 5a2, 5a3, 5a4 and 5a5 that are formed on an outer side of the magnet insertion hole 2b in the radial direction in the first iron core portion 2a1 and communicate with the magnet insertion hole 2b; a second slit group 5b consisting of five second slits 5b1, 5b2, 5b3, 5b4 and 5b5 that are formed in the first iron core portion 2a1 at positions opposed to and spaced apart from the respective first slits 5a1 to 5a5; and space portions 2e1 communicating with rotating direction end portions of the magnet insertion hole 2b. The space portions 2e1 function as flux barriers to prevent short circuiting of magnetic fluxes. Between each of the space portions 2e1 and the outer circumferential surface 2A of the rotor iron core 2a, a thin iron core portion 2a3 extending in the rotating direction is formed. In this embodiment, a thickness of the thin iron core portion 2a3 in the radial direction is equal to a plate thickness of the rotor iron core 2a.

The first slits 5a1 to 5a5 each communicate with the magnet insertion hole 2b so that the slits have an integral structure with the magnet insertion hole 2b. In contrast, the second slits 5b1 to 5b5 do not communicate with each other, and they do not communicate with the magnet insertion hole 2b. Further, the second slits 5b1 to 5b5 are structured not to appear on the outer circumferential surface 2A of the rotor iron core 2a, and thus each of them has a shape closed inside the rotor iron core 2a.

In the first iron core portion 2a1, there are formed five inter-slit iron core portions 6a1, 6a2, 6a3, 6a4 and 6a5 between the first slit group 5a and the second slit group 5b. Further, in the first iron core portion 2a1, there are formed five outer side iron core portions 6b1, 6b2, 6b3, 6b4 and 6b5 between the second slit group 5b and the outer circumferential surface 2A of the rotor iron core 2a, which are located on an outer side of the second slit group 5b in the radial direction.

Figure 4:
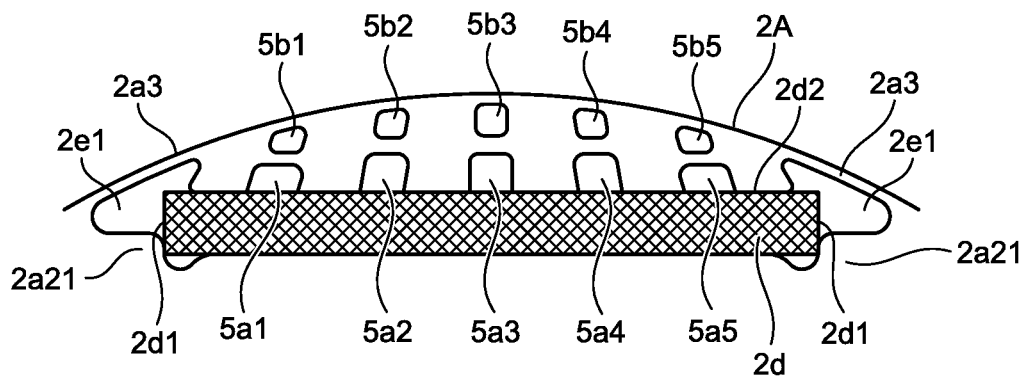
FIG. 4 is a view illustrating a state where a permanent magnet is inserted in the magnet insertion hole illustrated in FIG. 3.

As illustrated in FIG. 4, in a state where the permanent magnet 2d is inserted in the magnet insertion hole 2b, each space portion 2e1 extends from the inner circumferential surface of the thin iron core portion 2a3 to an rotating direction end surface 2d1 of the permanent magnet 2d. A pair of projections 2a21 are formed on the second iron core portion 2a2 to regulate position displacements of the permanent magnet 2d in the rotating direction. The projections 2a21 are formed at opposite ends of the radial direction inner surface 2b1 of the magnet insertion hole 2b in the rotating direction. The height of each projection 2a21 is set to ensure a dimension with which the projections 2a21 can come into surface-contact with the pair of rotating direction end surfaces 2d1 of the permanent magnet 2d positioned in the rotating direction, when the permanent magnet 2d is inserted into the magnet insertion hole 2b. The dimension that realizes such surface-contact is a dimension with which positional displacement of the permanent magnet 2d can be prevented, at the lower limit of dimensional tolerance of the permanent magnet 2d. In this embodiment, the dimension is set to 0.5 mm. However, by providing the projections 2a21, the projections 2a21 serve as the shortest magnetic paths that allow magnet fluxes, i.e., magnetic fluxes between adjacent permanent magnets 2d to be easily subjected to short circuiting. For this reason, the height of the projections 2a21 in the radial direction is preferably set to be as small as possible within a range of holding each permanent magnet 2d.

According to the configuration described above, magnetic fluxes flowing from the stator iron core 1a to the rotor 2 are isolated from the permanent magnet 2d by the first slit group 5a and the space portions 2e1 and easily pass through the inter-slit iron core portions 6a1 to 6a5. In this case, the magnetic fluxes are not interlinked in a radial direction outer side surface 2d2 of the permanent magnet 2d opposed to the first slit group 5a, but the magnetic fluxes are interlinked between the first slits adjacent to each other. Consequently, the loop of an eddy current flowing in the radial direction outer side surface 2d2 of the permanent magnet 2d becomes smaller, and thereby eddy current loss that is iron loss caused by the eddy current is reduced. By the reduced eddy current loss, the temperature rise of the permanent magnet 2d is suppressed, and thereby decrease of the magnetic force generated by the permanent magnet 2d with the temperature rise. Therefore, it is possible to suppress the decrease in efficiency and output and improve the demagnetization resistance. Further, even if a large diamagnetic field is applied by an eddy current, the diamagnetic field passes through the outer side iron core portions 6b1 to 6b5, the inter-slit iron core portions 6a1 to 6a5, and the thin iron core portions 2a3, and thereby the demagnetization resistance can be improved.

Second Embodiment

Figure 5:
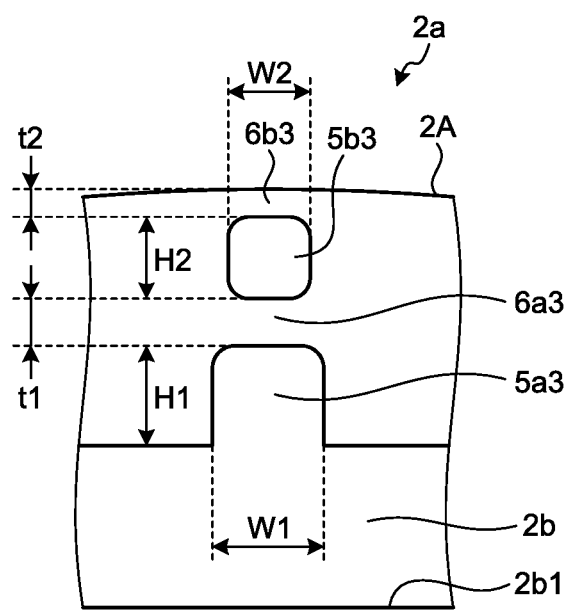
FIG. 5 is a structural view illustrating a rotor iron core according to a second embodiment of the present invention.

FIG. 5 is a structural view illustrating a rotor iron core according to a second embodiment of the present invention. In FIG. 5, a first slit and a second slit illustrated in FIG. 3 are shown in an enlarged state, and there are shown the first slit 5a3 of the first slit group 5a, the second slit 5b3 of the second slit group 5b, the inter-slit iron core portion 6a3, and the outer side iron core portion 6b3. W1 denotes a width of the first slit 5a3 in the rotating direction, H1 denotes a width of the first slit 5a3 in the radial direction, W2 denotes a width of the second slit 5b3 in the rotating direction, H2 denotes a width of the second slit 5b3 in the radial direction, t1 denotes a width of the inter-slit iron core portion 6a3 in the radial direction, and t2 denotes a width of the outer side iron core portion 6b3 in the radial direction. Here, W1 is a dimension at a boundary between the magnet insertion hole 2b and the first slit 5a3, and W2 is a dimension at the widest portion of a width of the second slit 5b3 in the circumferential direction. Further, the plate thickness of the rotor iron core 2a is not shown, but it is assumed as t3, and is of 0.2 mm to 0.5 mm in this embodiment.

The rotor iron core 2a according to this embodiment has a shape that satisfies a relation of H1>H2. If the shape satisfying this relation is adopted, magnetic fluxes flowing to the rotor 2 can be caused to stay more away from the permanent magnet 2d, and so the eddy current loss of the magnet can be reduced, and the demagnetization resistance can be improved.

Further, the rotor iron core 2a according to this embodiment has a shape that satisfies a relation of W1>W2. If the shape satisfying this relation is adopted, it is possible to improve the effect of dispersing magnetic fluxes flowing to the radial direction outer side surface 2d2 of the permanent magnet 2d at a distance of the first slit 5a3 as compared with a case where W1 is equal to W2, or W1 is smaller than W2, and so the loop of an eddy current flowing on the radial direction outer side surface 2d2 of the permanent magnet 2d can be made smaller. This further reduces the eddy current loss in the permanent magnet 2d, and thereby the temperature rise of the permanent magnet 2d is further suppressed. Consequently, it is possible to inhibit decrease of the magnetic force generated by the permanent magnet 2d due to the temperature rise, thereby to suppress the decrease in efficiency and output, and improve the demagnetization resistance. Further, even in the case of the shape satisfying a relation of W1>W2, when a large diamagnetic field is applied by an eddy current, the diamagnetic field passes through the outer side iron core portions 6b1 to 6b5, the inter-slit iron core portions 6a1 to 6a5, and the thin iron core portions 2a3, thereby to make it possible to improve the demagnetization resistance.

Further, the rotor iron core 2a according to this embodiment has a shape that satisfies a relation of t1≥t2≥t3. If the shape satisfying this relation is adopted, the diamagnetic field goes through the inner iron core portion, and so the permanent magnet embedded electric motor 100 with a high demagnetization resistance can be realized while ensuring a strength of the rotor iron core, even if a diamagnetic field is applied from the stator side.

Here, in FIG. 5, an explanation has been given only for the dimensional relationships among the first slit 5a3, the second slit 5b3, the inter-slit iron core portion 6a3, and the outer side iron core portion 6b3. However, dimensional relationships among the respective slits other than the first slit 5a3 and the second slit 5b3 is the same as that described above, and dimensional relationships among the iron core portions other than the inter-slit iron core portion 6a3 and the outer side iron core portion 6b3 is the same as that described above.

Further, in the first and second embodiments, the number of magnetic poles of the permanent magnets 2d is six, but the number of magnetic poles of the permanent magnets 2d is not limited to six. Further, in the first and second embodiments, the permanent magnets 2d have a flat plate shape, but are not limited to this shape. The permanent magnet 2d may have another shape for fitting a purpose such as noise reduction or demagnetization resistance improvement. In that case, the stator iron core 1a is supposed to be formed to correspond to shapes of the permanent magnets 2d.

Further, in the first and second embodiments, the five first slits and the five second slits are formed in the rotor iron core 2a, but the numbers of these slits are not limited to the example illustrated in the drawings. Further, in the first and second embodiments, the stator iron core 1a used here is of a separation type in which the stator iron cores are separated for each of the teeth, but a shape of the stator iron core 1a is not limited to this type. Further, the stator iron core 1a and the rotor iron core 2a according to the first and second embodiments are not limited to a type formed by stacking electromagnetic steel sheets on top of another, but may be an integrated core type formed by machining a steel material, a resin core type formed by hardening a mixture of resin and iron powder, or a dust core type formed by pressure-molding magnetic powder. Core types may be used differently depending on the purpose and/or application.

As described above, the permanent magnet embedded electric motor 100 according to the first and second embodiments includes: the stator 1; the rotor 2 disposed on the inner diameter side of the stator 1; and permanent magnets 2d respectively inserted in a number of magnet insertion holes 2b formed in the rotor iron core 2a of the rotor 2. The rotor iron core 2a includes: the plurality of first slits that are formed on an outer side of the magnet insertion holes 2b in the radial direction, and communicate with the magnet insertion hole 2b; the plurality of second slits formed at positions opposed to and spaced apart from the first slits; the inter-slit iron core portions formed between the first slits and the second slits; the outer side iron core portions formed between the second slits and the outer circumferential surface 2A of the rotor iron core 2a; the space portions 2e1 respectively communicating with the rotating direction end portions of the magnet insertion hole 2b; and the thin iron core portions 2a3 that are formed between the space portions 2e1 and the outer circumferential surface 2A of the rotor iron core 2a, and extend in the rotating direction. With this configuration, magnetic fluxes flowing from the stator to the rotor are isolated from the permanent magnets 2d by the first slits and the space portions 2e1, and the loop of an eddy current flowing to the radial direction outer side surface 2d2 of the permanent magnet 2d becomes smaller. Accordingly, the eddy current loss that is an iron loss caused by the eddy current is reduced, and decrease of the magnetic force of the permanent magnets 2d due to a temperature rise of the permanent magnets 2d is inhibited. Therefore, it is possible to suppress the decrease in efficiency and output, and improve the demagnetization resistance. Further, even if a large diamagnetic field is applied by an eddy current, the diamagnetic field passes through the outer side iron core portions, the inter-slit iron core portions and the thin iron core portions, thereby achieving improvement of the demagnetization resistance.

Third Embodiment

Figure 6:
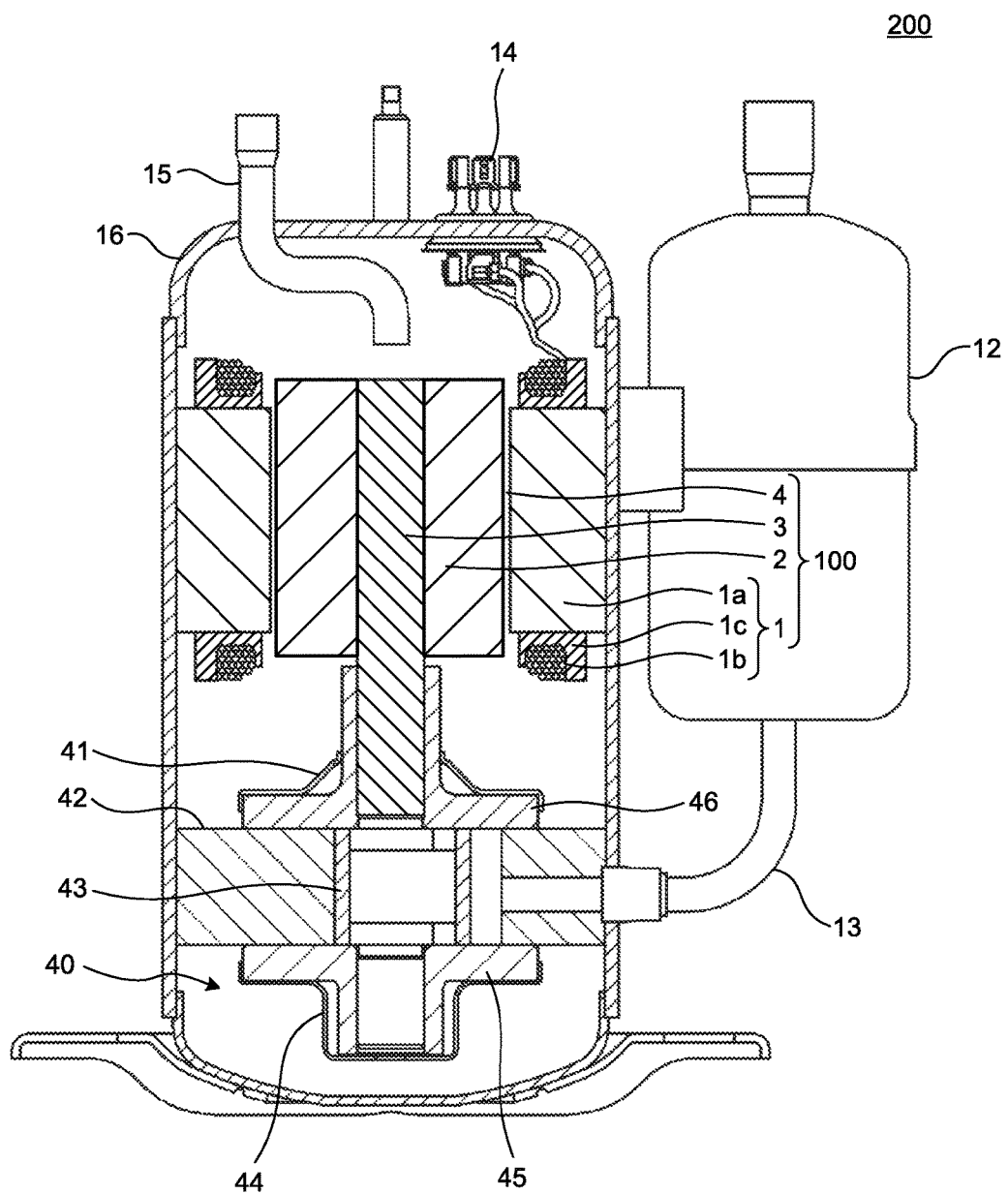
FIG. 6 is a sectional view of a compressor according to a third embodiment of the present invention.

FIG. 6 is a sectional view illustrating a compressor according to a third embodiment of the present invention. In the third embodiment, an explanation will be given of a compressor 200 equipped with the permanent magnet-embedded electric motor 100 according to one of the first and second embodiments.

The compressor 200 includes an airtight container 16 formed in a cylindrical shape by subjecting a steel plate having a specific thickness to a drawing process. The airtight container 16 is provided with the permanent magnet embedded electric motor 100 and a compressing unit 40. The airtight container 16 has a bottom part in which a refrigerator oil (not shown) for lubricating a sliding part of the compressing unit 40 is retained. The compressing unit 40 uses a mechanism such as scroll, rotary or reciprocation.

The stator iron core 1a is held by the inner circumferential portion of the airtight container 16 through shrinkage fitting, freeze fitting or press fitting. The windings 1b wound on the stator iron core 1a are supplied with an electric power from glass terminals 14 fixed on the airtight container 16.

The rotor 2 is disposed on the inner diameter side of the stator 1 with the gap 4 interposed therebetween, and is held in a rotatable state via the rotary shaft 3 by an upper frame 46 and a lower frame 45, which serve as a bearing part of the compressing unit 40.

The compressing unit 40 is configured to include, as main components: a cylinder 42 disposed set in a state such that its upper and lower sides are stacked on others; a piston 43 in which the rotary shaft 3 is inserted; a pair of the upper frame 46 and the lower frame 45 in which the rotary shaft 3 is inserted, which close the axial direction end surfaces of the cylinder 42; an upper discharge muffler 41 fitted on the upper frame 46; a lower discharge muffler 44 fitted on the lower frame 45; and a vane (not shown) separating the inside of the cylinder 42 into a suction side and a compression side.

Next, an operation of the compressor 200 will be explained. A refrigerant gas supplied from an accumulator 12 is sucked into the cylinder 42 through a suction pipe 13 fixed on the airtight container 16. When the rotor 2 is rotated by energization of an inverter, the piston 43 fitted in the rotary shaft 3 is rotated inside the cylinder 42, and the refrigerant is compressed inside the cylinder 42. The compressed refrigerant with a high temperature passes through the upper discharge muffler 41 and the lower discharge muffler 44, and moves upward inside the airtight container 16 through the gap 4 or an air hole (not shown) formed in the rotor 2. Then, the compressed refrigerant passes through a discharge pipe 15 provided to the airtight container 16, and is supplied to the high-pressure side of the refrigeration cycle.

As the refrigerant for the compressor 200, conventionally existing R410A and R407C, which are an HFC hydrofluorocarbon-based refrigerant, or R22, which is a hydrochlorofluorocarbon-based refrigerant, is used, but a refrigerant with a low global warming potential (which will be referred to as "low GWP") or a refrigerant other than the low GWP refrigerant may be used. In consideration of global warming prevention, a low GWP refrigerant is preferably used. As typical examples of low GWP refrigerants, there are following refrigerants:

(1) HFO-1234yf ($CF_3CF=CH_2$), which is an example of halogenated hydrocarbon having double bond of carbon in the composition. The "HFO" is abbreviation of Hydro-Fluoro-Olefin, and the "Olefin" is unsaturated hydrocarbon having one double bond. Here, HFO-1234yf has a GWP of 4.

(2) R1270 propylene, which is an example of hydrocarbon having double bond of carbon in the composition. Here, R1270 propylene has a GWP of 3 smaller than that of HFO-1234yf, but is more flammable than HFO-1234yf.

(3) A mixture of HFO-1234yf and R32, which is an example of a mixture containing either one of halogenated hydrocarbon having double bond of carbon in the composition and hydrocarbon having double bond of carbon in the composition. HFO-1234yf is a low-pressure refrigerant and thus entails larger pressure loss, and so the performance tends to easily lower in the refrigeration cycle, particularly in an evaporator. For that reason, a mixture with R32 or R41 that is a refrigerant of higher pressure than HFO-1234yf is more useful in practice.

A temperature inside the compressor 200 is different, depending on the compression load conditions, i.e., a rotational speed, a compression load torque or a refrigerant type. In the steady state with the temperature being stable, the temperature has higher dependency on the rotational speed in particular. When the R410 refrigerant is used, the temperature inside the rotary compressor rises with respect to the rotational speed, such that it is 50° C. to 60° C. in a low-speed operation, and it becomes 70° C. to 80° C. in a middle-speed operation, and 90° C. to 110° C. in a high-speed operation. In this way, there appears a characteristic in that, as the rotational speed of the compressor 200 is increased, the temperature inside the compressor 200 is higher. When the R32 refrigerant is used, the temperature inside the compressor 200 becomes further higher by 20° C., as compared with the R410A refrigerant.

In the compressor 200 structured as described above, there is exerted an effect that a reliable compressor 200 can be provided, in which the temperature rise of the permanent magnets 2d is suppressed by the reduced eddy currents flowing to the permanent magnets 2d, and demagnetization of the permanent magnets 2d is hardly caused even if the permanent magnets 2d are present in a high temperature atmosphere inside the compressor 200.

Further, since the first slits are set in contact with the radial direction outer side surfaces 2d2 of the permanent magnets 2d, the refrigerant passes through the first slits thereby to recover heat of the permanent magnets 2d generated due to the eddy currents. Consequently, it is possible to suppress the temperature rise of the permanent magnets 2d, and inhibit the torque from decreasing.

Further, since demagnetization resistance of the magnet is improved, a rare-earth magnet having a low coercive force can be used, so as to lower the cost. The rare-earth magnet having a low coercive force means one having a coercive force of 20 kOe or less.

Fourth Embodiment

Figure 7:
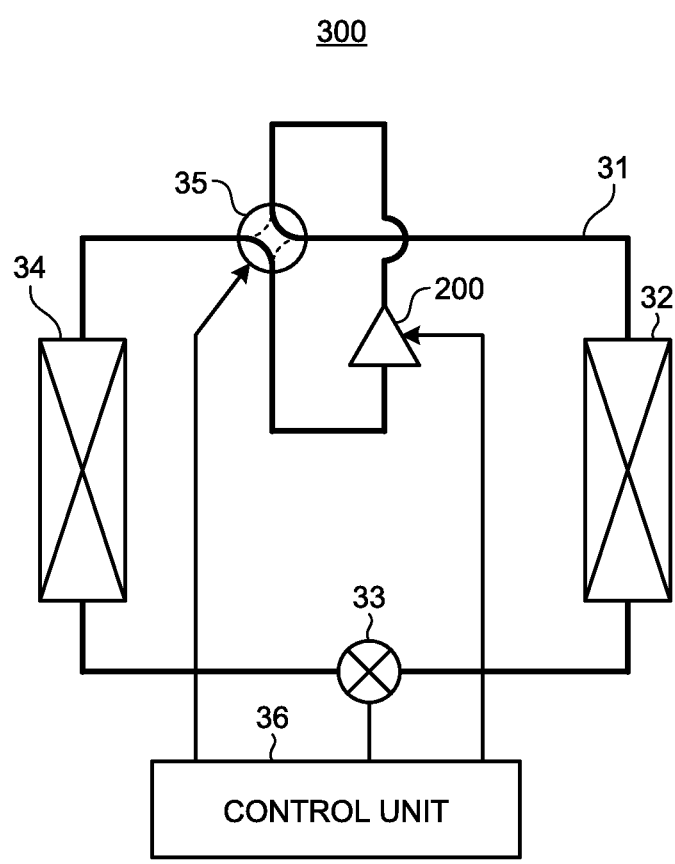
FIG. 7 is a configuration diagram of a refrigeration air conditioner according to a fourth embodiment of the present invention.

FIG. 7 is a configuration diagram of a refrigeration air conditioner according to a fourth embodiment of the present invention. In the fourth embodiment, an explanation will be given for a refrigeration air conditioner 300 equipped with the compressor 200 according to the third embodiment.

The refrigeration air conditioner 300 is composed of, as main components: the compressor 200; a four-way valve 35; a condenser 32 that heat-exchanges a high-temperature and high-pressure refrigerant gas having been compressed by the compressor 200 with air to make condensation into a liquid refrigerant; an expander 33 for expanding the liquid refrigerant into a liquid refrigerant with a low temperature and a low pressure; an evaporator 34 that absorbs heat from the liquid refrigerant to turn the low-temperature and low-pressure liquid refrigerant into a gas refrigerant with a low temperature and a low pressure; and a control unit 36 controlling the compressor 200, the expander 33 and the four-way valve 35. The compressor 200, the four-way valve 35, the condenser 32, the expander 33 and the evaporator 34 are respectively connected by refrigerant pipes 31 to implement a refrigeration cycle. By using the compressor 200, it is possible to provide the refrigeration air conditioner 300 having high efficiency and high output.

The configurations illustrated in the above embodiments are mere examples of the contents of the present invention, and they can be combined with other publicly known techniques. Further, the configurations can be partly omitted or modified without departing from the scope of the present invention.

The invention claimed is:

1. A permanent magnet embedded electric motor comprising:
    a stator;
    a rotor disposed on an inner diameter side of the stator; and
    permanent magnets inserted in a plurality of magnet insertion holes formed in a rotor iron core of the rotor, wherein
    the rotor iron core includes:
        a plurality of first slits that are formed on an outer side of the magnet insertion hole, and communicate with the magnet insertion hole;
        a plurality of second slits formed at positions opposed to and spaced apart from the first slits;
        inter-slit iron core portions formed between the first slits and the second slits;
        outer side iron core portions formed between the second slits and an outer circumferential surface of the rotor iron core;
        space portions communicating with rotating direction end portions of the magnet insertion hole; and
        thin iron core portions that are formed between the space portions and the outer circumferential surface of the rotor iron core, and extend in a rotating direction, and
    the rotor iron core has a shape satisfying a relation of H1>H2, where H1 denotes a width of the first slit in a radial direction, and H2 denotes a width of the second slits in a radial direction.

2. A permanent magnet embedded electric motor comprising:
    a stator;
    a rotor disposed on an inner diameter side of the stator; and
    permanent magnets inserted in a plurality of magnet insertion holes formed in a rotor iron core of the rotor, wherein
    the rotor iron core includes:
        a plurality of first slits that are formed on an outer side of the magnet insertion hole, and communicate with the magnet insertion hole;
        a plurality of second slits formed at positions opposed to and spaced apart from the first slits;
        inter-slit iron core portions formed between the first slits and the second slits;
        outer side iron core portions formed between the second slits and an outer circumferential surface of the rotor iron core;
        space portions communicating with rotating direction end portions of the magnet insertion hole; and
        thin iron core portions that are formed between the space portions and the outer circumferential surface of the rotor iron core, and extend in a rotating direction, and
    the rotor iron core has a shape satisfying a relation of W1>W2, where W1 denotes a width of the first slit in a rotating direction, and W2 denotes a width of the second slit in a rotating direction.

3. A permanent magnet embedded electric motor comprising:
    a stator;
    a rotor disposed on an inner diameter side of the stator; and
    permanent magnets inserted in a plurality of magnet insertion holes formed in a rotor iron core of the rotor, wherein
    the rotor iron core includes:
        a plurality of first slits that are formed on an outer side of the magnet insertion hole, and communicate with the magnet insertion hole;
        a plurality of second slits formed at positions opposed to and spaced apart from the first slits;
        inter-slit iron core portions formed between the first slits and the second slits;
        outer side iron core portions formed between the second slits and an outer circumferential surface of the rotor iron core;
        space portions communicating with rotating direction end portions of the magnet insertion hole; and
        thin iron core portions that are formed between the space portions and the outer circumferential surface of the rotor iron core, and extend in a rotating direction, and
    the rotor iron core has a shape satisfying a relation of $t1 \geq t2 \geq t3$, where t1 denotes a width of the inter-slit iron core portion in a radial direction, t2 denotes a width of the outer side iron core portion in a radial direction, and t3 denotes a plate thickness of one steel sheet of a plurality of steel sheets forming the rotor iron core.

4. A compressor comprising the permanent magnet embedded electric motor according to claim 1.

5. A refrigeration air conditioner comprising the compressor according to claim 4.

6. A compressor comprising the permanent magnet embedded electric motor according to claim 2.

7. A compressor comprising the permanent magnet embedded electric motor according to claim 3.

8. A refrigeration air conditioner comprising the compressor according to claim 6.

9. A refrigeration air conditioner comprising the compressor according to claim 7.

* * * * *